United States Patent [19]

Forster et al.

[11] 4,024,318

[45] May 17, 1977

[54] METAL-FILLED PLASTIC MATERIAL

[75] Inventors: Eric O. Forster, Scotch Plains; Byron M. Vanderbilt, Westfield, both of N.J.

[73] Assignee: Exxon Research and Engineering Company, Linden, N.J.

[22] Filed: Feb. 17, 1966

[21] Appl. No.: 528,080

[52] U.S. Cl. ............................ 428/519; 260/37 M; 343/18 A; 428/457; 428/515; 428/517
[51] Int. Cl.² ........................................ B32B 5/16
[58] Field of Search ................. 161/162, 168, 247; 260/37, 41 B, 37 M; 343/18 A; 252/478; 428/457, 515, 517, 519

[56] References Cited

UNITED STATES PATENTS

| | | | |
|---|---|---|---|
| 2,992,426 | 7/1961 | Borcherdt | 343/18 |
| 3,007,160 | 10/1961 | Halpern | 343/18 |
| 3,187,331 | 6/1965 | Beller | 343/18 |
| 3,315,259 | 4/1967 | Wesch | 343/18 |
| 3,349,396 | 10/1967 | Reed | 343/18 |

Primary Examiner—Leland A. Sebastian
Attorney, Agent, or Firm—David A. Roth

[57] ABSTRACT

A filled plastic composition, suitable for use as a radar shield, comprising (1) a first layer of hydrocarbon thermosetting plastic filled with metal particles of aluminum, iridium, tin, lead, bismuth, or elements from Group IIB to Group VIIB of the Periodic Table of the Elements and (2) a second layer of hydrocarbon thermosetting plastic filled with oxides of the above metals is disclosed.

21 Claims, No Drawings

METAL-FILLED PLASTIC MATERIAL

This invention relates to processes and compositions which are useful to shield metallic objects so that they cannot be detected by radar signals, and other electromagnetic waves.

Radar, which is an abbreviation for radio detection and ranging, is a technique of echo sounding by means of radio waves. There are two main types of radar, i.e., continuous wave (c-w.) and pulse.

Radar equipment directs a narrow beam of r-f. energy over a region to be searched. When the beam strikes any object, a small amount of the energy is reradiated and returned to the radar, which indicates the echo. The bearing or elevation of the object can be determined from the direction in which the radar antenna is pointed; the range of the object is determined from the time interval between the instant of energy transmission and the instant of echo reception. As r-f. energy travels at a velocity of 328 yards per microsecond, and as the r-f. energy must travel from transmitter to target and back, the range (in yards) is equal to the time interval (in microseconds) between the instant of energy transmission and the instant of echo reception times 164.

The time interval is measured by using the sweep of a spot of a cathode-ray tube. The spot sweep is started at the instant that the r-f. energy is transmitted; the spot is then either deflected or intensity modulated by the returning echo, depending on the type of indication.

From its inception as a significant military weapon just prior to World War II, there has been considerable effort in developing countermeasures for radar. The countermeasures that have been adopted involve sophisticated electronic techniques such as using a panoramic adapter to analyze the frequency components of a received signal to be able to block or jam the enemy's communications. Mechanical countermeasures involve dispersing artificial reflectors such as metal strips from aircraft in order to give false signals. Recently, it appears that one can prevent radar detection by using extremely heavy or thick layers of dielectric or magnetic materials. These are usually too heavy and bulky to be of much practical use.

Some theoretical discussion may be of interest although it is to be understood that applicants are not bound by these theories. The reflection of high frequency electromagnetic radiation (microwaves) from solid surfaces, particularly from metals, is known to be caused by the difference in intrinsic impedances of the solid ($Z_s$) and that of free space. The purpose of a good radar absorbing material (RAM) will be to overcome this mismatch of impedances and provide a smooth transition from free space to the solid surface.

Since the impedance of a material is related to the dielectric and magnetic properties of the material, i.e., $Z_s = \epsilon_s^*/\mu_s^*$, where $\epsilon_s^*$ and $\mu_s^*$ are the complex dielectric constant and the complex permeabilities respectively, the development of such RAM endeavors to find ways of changing both $\epsilon_s^*$ and $\mu_s^*$ so that their ratio equals that of free space. While such impedance matching can be done rather successfully over a narrow frequency range, a solution of the practical problem requires the development of a material capable of matching impedances over as broad a frequency range as possible.

The ideal solution of this problem would be the development of a material in which $\epsilon_s^*$ and $\mu_s^*$ change continuously from a value close to that of free space to that of a metal over all desired frequencies. A less ideal but effective solution is the invention herein, i.e., the development of laminar structures of artificial dielectrics.

It has now been discovered and forms the substance of this invention that extremely practical and effective materials can be prepared which will shield metallic objects from radar detection. In brief, the shielding materials are composed of thermosetting hydrocarbon polymers containing very high quantities of metal powders and metal oxide powders in combination.

In one preferred aspect, the shield comprises a combination of a plastic filled with a high loading of a metal oxide and a separate plastic filled with a high loading of a metal. By superimposing a layer of the oxide-filled plastic upon a layer of the metal-filled plastic or vice versa, a screen is produced which has a ratio of complex permeability to complex dielectric constant which approaches one over much of the desired frequency range. As this ratio approaches one, the material becomes, in effect, less and less visible to radar. It simultaneously reflects very little of the radar wave and is opaque to the radar wave.

Thus, in summary, by a judicious choice of a transition metal and a metal oxide, it is possible to prepare filled hydrocarbon plastics with both low radar reflection coefficient and low transmission.

For best results, the metal concentration should range from 40 to 93% by weight of the formulation with a range of 60 to 88% preferred. The concentration of metal oxide is 40 to 90%, preferably 65 to 80%, and most preferably, 45 to 75% by weight. The weight of metal is based on the combination of metal and plastic and the weight of oxide is based on the combination of oxide and plastic.

The particle size of the metal and of metal oxide should be in the range of 0.1 to 30 microns on the average with a range of 1.0 to 20 $\mu$ preferred. The anti-radar material can be prepared by bonding together a metal filled hydrocarbon plastic and a metal oxide filled plastic or alternatively by producing discrete layers of the metal oxide and the metal in the plastic prior to curing.

The total thickness of the two layers comprising the metal oxide filled plastic and the metal-filled plastic should be about 0.030 to 0.250 cm, preferably 0.060 to 0.150 cm. Of this, the metal-filled layer should comprise about 0.015 to 0.200 cm, preferably 0.020 to 0.125 cm. Moreover it is desirable that the density be kept down to the minimum possible to avoid adding excess weight to the shield if it is to be used for aircraft or other flying objects.

It is also possible to mix the metal oxide and the metal in the same resin prior to curing and such preparation is usually inferior to the preferred laminar described in this application.

While the subsequent Examples refer only to thermosetting hydrocarbon resins, the principles of this concept apply equally well to thermoplastic and elastomeric materials. By similar techniques it should be possible to produce rubbery absorbers as well as rapidly curing paints for surface coatings and other resinous products. However, it is a key feature of the invention that the plastic be nonpolar in character; for instance, plastics which contain more than minor quantities of oxygen are not suitable.

In one Example, a polybutadiene plastic which contains 700 parts of nickel and 100 parts of resin was formed into a sheet 1/16 of an inch thick. A similar size sheet 1/16 of an inch thick was also prepared from the same polymer and nickel oxide where the composition was 400 parts of nickel oxide to 100 parts of polymer.

The reflection coefficient of the metal-filled sheet was measured and was found to have a value of 0.8 which was similar to that of a pure metal plate and was not transparent. The reflection coefficient of the nickel oxide-filled sheet was also measured and found to be far less reflective having a value of 0.4 but was transparent to microwaves.

However, when the two sheets were combined together by first converting to a B-stage state of cure and then adhered by completing the cure in contact under pressure and tested with the nickel oxide side facing a radar beam, the reflection coefficient was reduced to 0.25 and no radiation was transmitted through the sample. Similar results were obtained with combinations of iron or nickel composites with layers containing ferric oxide ($Fe_2O_3$) or ferroferric oxide ($Fe_3O_4$) or mixtures thereof.

A reflection coefficient of 0.2 is the value of the pure resin and, therefore, it can be seen that the combination of the two sheets effected an unexpected lowering of the reflection coefficient to that almost equivalent to the pure resin alone.

The two layers can be prepared in any convenient manner. The preferred techniques are: (a) forming two entirely separate sheets, usually as B-staged cured moldings, one containing oxide and one containing metal, and then combining the two as a final cured composite laminate; and (b) forming a laminate structure by first blending the more dense component with the resin and subjecting this layer to partial curing. Then, the less dense filler portion can be blended with another portion of resin and poured over the precured first layer. In both cases, the laminate is cured to completion and excellent bonding between the two layers is obtained. A third technique is to cure two separate sheets and then adhere them using a suitable adhesive. Prior to adhering, the two sheets are ground to make possible intimate contact at the interface, the adhesive applied, and the adhesive set by allowing to stand at room temperature under mild pressure or heated depending on the type of adhesive used.

The metal-filled and metal oxide-filled plastics used as shields are not brittle and do not crack under temperature and pressure conditions used in molding operations. They have good impact resistance as well as high flexural, compressive and tensile strengths as well as excellent resistance to aqueous media. They can be machined into various shapes including thin sheets.

The metal or metal oxide filled plastics are prepared by curing a thermosetting resinifiable mix admixed with metal powders, at least one organic peroxide, and optional amounts of an organosilane. The metal or metal oxide filled resinifiable thermosetting mixture is prepared by mixing a resinifiable mix, metal or metal oxide particles, (i.e., powders), peroxides and optional amounts of a silane by any well-known technique such as stirring, kneading, etc., at temperatures of 50° to 150° F., preferably 70° to 125° F.

The components of the resinifiable mix are as follows:

A. The first component of the resinifiable mix is a substantially hydrocarbon material selected from the group consisting of:

1. (a) About 30 to about 70, preferably 50 to 60 wt.% based on the weight of the resinifiable mix of a resinous polymer having at least 50% of its total unsaturation as the 1,2-ethylenic type, a number average molecular weight of up to 15,000, preferably 2000 to 5000, and prepared from about 50 to 100 mole % of a $C_4$ to $C_6$ conjugated diolefin and about 50 to 0 mole % of a styrene-type monomer and (b) about 30 to about 70, preferably 40 to 50 wt.%, based on the weight of the mix, of a reactive diluent; and 2. (a) About 50 to about 95, preferably 70 to 85 wt.%, based on the weight of the mix, of a styrene-type monomer and (b) about 0.5 to about 20, preferably 5 to 10 wt.% based on the weight of the mix, of at least one monomeric nonconjugated, multiunsaturated cross-linking agent.

Suitable examples of $C_4$ to $C_6$ conjugated diolefins include butadiene, hexadiene, isoprene, dimethyl butadiene, piperylene, methyl pentadiene, etc. The styrene-type monomers may be represented by the general formula:

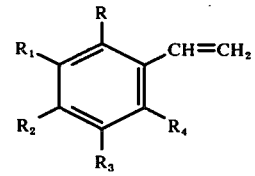

wherein R, $R_1$, $R_2$, $R_3$ and $R_4$ are the same or different groups and are independently selected from the group consisting of hydrogen and $C_1$ to $C_{18}$, preferably $C_1$ to $C_5$, alkyl radicals. Specific nonlimiting examples of suitable styrene-type monomers include styrene, ortho-methylstyrene, meta-methylstyrene, para-methylstyrene, ortho-ethylstyrene, para-ethylstyrene, 2,3-dimethyl styrene, 2,4-dimethylstyrene, 2,5-dimethylstyrene, para-tertbutylstyrene, etc.

When the substantially hydrocarbon material comprises a $C_4$ to $C_6$ conjugated diolefinic homopolymer or copolymer, the polymers may be normally liquid or solid in nature depending upon their molecular weights and the mole percentages of the diolefin and styrene-type monomers.

The preferred choice of homopolymer for the substantially hydrocarbon material is homo-polybutadiene having a number average molecular weight of about 2000 to 5000 so that it is normally liquid in nature. The preferred choice of copolymer for the substantially hydrocarbon material is the normally liquid copolymer of butadiene and styrene having a number average molecular weight of about 2000 to 5000 and a styrene content of about 1 to 30 mole %. However, it should be understood that the normally solid, resinous copolymers are also useful, particularly those having number average molecular weights of about 8000 to 15,000.

When the substantially hydrocarbon material is monomeric in nature, the styrene-type monomer is preferably styrene in admixture with at least one monomeric, nonconjugated, multiunsaturated cross-linking agent; a detailed description of useful multiunsaturated cross-linking agents appears below.

The substantially hydrocarbon materials to be used in this invention should not contain over about 5 wt. %, based on the weight of the material, of functional, i.e., nonhydrocarbon groups such as oxygen, nitrogen, sulfur, halogens, etc. When the substantially hydrocarbon material is to be a $C_4$ to $C_6$ conjugated diolefinic homopolymer or copolymer, care should be taken to choose the appropriate polymerization reaction which will yield a polymer having at least 50% of its olefinic unsaturation as the 1,2-ethylenic type. Polymers formed by 1,4-polymerization are not suitable as they do not contain appreciable amounts of the required vinyl side groups. Accordingly, the polymers are preferably prepared with the aid of catalysts such as metallic sodium, alkyl lithiums, etc. The processes for preparing these polymers do not constitute part of this invention for they are old in the art, see for example, U.S. Pat. Nos. 2,762,851 and 3,097,108.

The reactive diluent, employed when the substantially hydrocarbon material is a $C_4$ to $C_6$ conjugated diolefinic homopolymer or copolymer, comprises a styrene-type monomer of the type described above. The reactive diluent may be the same or different styrene-type monomer actually used in preparing the $C_4$ to $C_6$ conjugated diolefinic copolymer; preferably the reactive diluent is meta-methylstyrene (usually known as vinyl toluene).

The monomeric, nonconjugated multiunsaturated cross-linking agents suitable for the purposes of this invention may be multivinyl aromatic or multivinyl aliphatic compounds. The multivinyl aromatic compounds having the general formula:

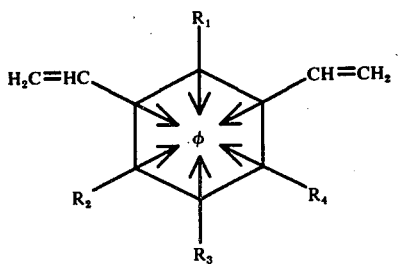

wherein $R_1$, $R_2$, $R_3$ and $R_4$ attached to the ring are each independently selected from the group consisting of hydrogen, halogens, alkyl groups containing up to 4 carbon atoms, and vinyl, and $\phi$ is an aromatic nucleus such as benzene, naphthalene, biphenyl and phenanthrene. Specific examples are divinyl benzene, divinyl toluene, divinyl xylene, divinyl naphthalene, and trivinyl benzene. A preferred compound is divinyl benzene. Other multiunsaturated monomers of aliphatic nature may be used alone or admixed with the multivinyl aromatic compounds defined above. These include the methacrylate esters of $C_2$ to $C_{12}$ polyhydric alcohols such as ethylene dimethacrylate, butyl dimethacrylate and the trimethacrylate esters of trimethylol propane. Also, the corresponding acrylate esters of $C_2$ to $C_{12}$ polyhydric alcohols may be used, or multivinyl esters such as divinyl adipate and multiallyl esters such as triallyl cyanurate (preferably used as a solution in petroleum ether or other organic solvent) may be used; vinyl fumarate, allyl fumarate, and the multivinyl ethers are likewise applicable. However, the multivinyl aromatics and the methacrylate esters of the polyhydric alcohols are preferred. If divinyl benzene is employed in this embodiment, it is advantageous to have it contain a minimum of a styrene-type monomer and saturates such as diethyl benzene. Commercial grade divinyl benzene contains about 55% of the active ingredient and about 40% of ethyl styrene. Although this concentration of divinyl benzene is applicable, improved results are obtained with divinyl benzene of 80% or even higher concentration.

B. The second component of the resinifiable mix is a peroxide-curable elastomer employed in an amount ranging from about 4 to about 35 wt. %, preferably 6 to 10 wt. % when the substantially hydrocarbon material is a diolefinic homopolymer or copolymer and a reactive diluent, and preferably 10 to 20 wt. % when the substantially hydrocarbon material is a styrene-type monomer and a multiunsaturated cross-linking agent, based on the weight of the resinifiable mix. The elastomer will generally have a Mooney viscosity in the range of about 10 to about 70, preferably 25 to 40. It has been found that the elastomer is a necessary component of the resinifiable mix since it prevents the metal particles from settling to the bottom of the mix, assures adequate flowability of the metal particles in the resinifiable mix during molding operations and prevents brittleness in thin molded metal-filled plastic segments. Suitable peroxide-curable elastomers include natural rubber, synthetic polyisoprenes, ethylene-alphaolefin copolymers and terpolymers such as ethylene-propylene rubbers, ethylene-propylene-methylene norbornene rubbers, etc., butadiene-styrene copolymers, polybutadiene, etc., and mixtures thereof. Natural rubber (pale crepe) is preferred over most synthetic elastomers since the latter may contain extraneous impurities such as soaps, acids, catalyst residues, etc., which may have detrimental effects upon the electrical properties of the metal-filled thermoset plastics.

Admixed with the resinifiable mix is a metal in the form of particles having an average particle size of about 0.1 to about 100, preferably 0.3 to 30 microns, as measured by X-ray line broadening. Small amounts, e.g., 0.1 to 10, preferably 1 to 5 wt. %, based on the weight of the particles, of particles as large as 200 or as small as 0.01 microns may be tolerated without markedly affecting the properties of the molded metal-filled plastics prepared from the mixture. The metal particles may have any particle shape desired although the selection thereof may depend upon the intended end use of the metal-filled plastic, e.g., spherical shapes are useful where high metal filler loadings are desired, platelets or prismatic shapes are particularly useful where the metal-filled plastic is to be used as a dielectric material for capacitors, whiskers are preferably employed where anisotropic electromagnetic properties are desired, etc. For the purposes of this invention, it is necessary that the metal particles be employed in amounts ranging from about 150 to 1500, preferably 230 to 1000, parts by weight, per 100 parts of the resinifiable mix.

The metal particles to be used in this invention are commercially available and may be prepared by well-known methods such as atomization, decomposition of metal carbonyls or metal hydrides, reduction of metal oxides, ball milling, grinding, etc. For the purposes of this invention, the term filler comprises the metallic forms, the metal oxide forms, or mixtures or alloys of various metallic forms, metal oxide forms or metallic-metallic oxide forms of the elements aluminum, indium, tin, lead, bismuth and Group IIB to VIIB elements of the Periodic System such as zinc, cadmium, scandium, titanium, zirconium, vanadium, chromium, molybdenum, tungsten, manganese, rhenium, iron, ruthenium, osmium, cobalt, rhodium, iridium, nickel, palladium, platinum, etc.; the Periodic System employed in describing this invention is that which appears in the Periodic Chart of the Elements on pages i - ii of "The Merck Index", published by Merck and Co., Inc., Rahway, New Jersey (Seventh Edition, 1960).

Preferably, the metals when used as such rather than oxides are employed in their metallic, rather than their metallic oxide forms, although excellent results may be obtained with metals which readily form thin oxide coatings, e.g., aluminum, iron, etc. Best results have been obtained with the use of metals such as aluminum, zinc, iron, cobalt, nickel, tin and lead as well as mixtures thereof. In principle, silver may be used although its cost and density renders it disadvantageous for most applications; copper should be avoided since its tendency to oxidize within the plastic matrix in turn may result in an oxidative breakdown of the plastic matrix.

The preferred metals to be used in this invention are nickel, iron, zinc and aluminum. The preferred oxides are nickel oxide, iron oxides including a mixture of $Fe_3O_4$ and $Fe_2O_3$ as well as the separate iron oxide species, ZnO and $Al_2O_3$. Of these, iron oxide and zinc oxide are particularly preferred. It should be further noted that ferrites such as mixtures of $Fe_3O_4$ and other metals, ZnNi ferrite, MnNi ferrite and LiNi ferrite can all replace the metal oxide. Barium ferrite can replace the metal particles. Typical combinations are aluminum, nickel or iron with ZnNi ferrite, or MnNi ferrite or with mixtures of ZnNi and MnNi ferrites.

The mixture of the metal particles or metal oxides and resinifiable mix must also include at least one organic peroxide; the total peroxide content ranges from bout 0.5 to about 6, preferably 3 to 4 parts when the substantially hydrocarbon material comprises a conjugated diolefinic homopolymer or copolymer and a reactive diluent and preferably 1 to 2 parts when the substantially hydrocarbon material comprises a styrene-type monomer and a multiunsaturated cross-linking agent, per 100 parts of the resinifiable mix. The peroxide may be any of those well-known in the prior art for curing resinifiable thermosetting materials, such as di-tert-butyl peroxide, 2,5-dimethyl-2, 5-bis-(tert-butyl peroxy) hexane, 2,5-dimethyl-2, 5-bis-(tert-butyl peroxy) hexyne-3, benzoyl peroxide, di-tert-butyl-diperphthalate, tert-butyl perbenzoate, dicumyl peroxide, cumene hydroperoxide, 2,4-di-(tert-butyl peroxyisopropyl) benzene, tert-butyl cumyl peroxide, etc., and mixtures thereof. Especially preferred are peroxides and peroxide mixtures wherein the peroxide is suitable for use at curing temperatures of 275° F. and higher such as dicumyl peroxide, benzoyl peroxide, 2,5-dimethyl-2,5-bis-(tert-butyl peroxy) hexane, 2,5-dimethyl-2,5-bis-(tert-butyl peroxy) hexyne-3, 2,4-di-(tert-butyl peroxyisopropyl) benzene, tert-butyl perbenzoate and mixtures thereof.

Although the monomeric, nonconjugated multiunsaturated cross-linking agent is a necessary ingredient when the substantially hydrocarbon material makes use of a styrene-type monomer (the styrene-type monomer would polymerize to a thermoplastic rather than thermoset condition without the cross-linking agent), it may also be employed where the substantially hydrocarbon material makes use of a $C_4$ to $C_6$ conjugated diolefinic homopolymer or copolymer. These resinous polymers possess cross-linking properties and accordingly the cross-linking agents need be used only where such resinous polymers are not present or where end use applications demand a highly cross-linked metal-filled thermoset plastic, i.e., one which is cross-linked to a higher degree than could be achieved via the cross-linking imparted by the $C_4$ to $C_6$ conjugated diolefinic homopolymers or copolymers. In the later case, the multiunsaturated cross-linking agents may be employed in amounts up to 10 wt. %, preferably 2 to 5 wt. %, based on the weight of the resinifiable mix.

Finally, the mixture of metal particles, resinifiable mix, peroxide and multiunsaturated cross-linking agent (if used) desirably also contains a coupling agent to impart maximum strength to the metal-filled thermoset plastic. However, it has been found that the electrical properties of the metal-filled thermoset plastic are not in any way deleteriously affected by the absence of the coupling agent; indeed, in certain cases, it appears that slightly higher dielectric constants and slightly lower dissipation factors result when the coupling agent is not present.

The coupling agent which serves to bring about a better bond between metal particles and the plastic matrix is preferably an unsaturated organosilane which is employed in amounts ranging from 0 to about 5, preferably 2 to 4 parts by weight, per 100 parts of the resinifiable polymeric mix. Although the metal particles may be treated with the organosilane rather than adding the organosilane to the resinifiable mix, the latter technique has been found to be more convenient and leads to at least as good or better results.

The term "organosilane" as employed herein includes the silane, its silanols (the corresponding partially or completely hydrolyzed forms of the silane), its siloxanes (the corresponding condensation products of the silanols) and mixtures thereof. The organosilane may be represented by the formula:

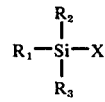

wherein $R_1$ is a $C_2$ to $C_{16}$ radical containing vinyl-type unsaturation selected from the group consisting of alkenyl, styryl, alkenoylalkyl and alkenoyloxyalkyl; X is selected from the group consisting of hydroxyl, alkoxy and acyloxy; $R_2$ and $R_3$ are independently selected from the group consisting of hydroxyl, methyl, alkoxy, acryloxy and $R_1$. Nonlimiting useful compounds which may be employed are the following: vinyl tri(beta-methoxy ethoxy)-silane, vinyl triethoxy silane, divinyl diethoxy silane, allyl triacetoxy silane; and in place of the vinyl and allyl groups of the above-named compounds, the corresponding styryl, acryloalkyl, methacryloalkyl, acryloxy propyl and methacryloxy propyl compounds. All of the silanes are convertible into the useful corresponding silanols by partial or complete hydrolysis with water. The preferred organosilanes of choice are gamma-methacryloxypropyl trimethoxy silane and vinyl tri-(beta-methoxyethoxy) silane.

The mixture of the resinifiable mix, metal particles, peroxides, cross-linking agents (if used) and organosilanes (if used) may then be cured to yield a metal and-/or metal oxide filled thermoset plastic with the aid of elevated temperatures and pressures. Generally, such curing operations take place in a mold (by the well-known techniques of compression or transfer molding) of the shape desired for end-use applications. Curing temperatures should be in the general range of about 150° to about 400° F., preferably 310° to 350° F., when the substantially hydrocarbon material is a conjugated diolefinic homopolymer or copolymer and a reactive diluent and preferably at 220° to 275° F. when the substantially hydrocarbon material is a styrene-type monomer and a multiunsaturated cross-linking agent; the pressure during molding operations is generally in the range of about 100 to about 2000 psig, preferably 500 to 1000 psig, and the curing time may range from about 10 minutes to about two hours, preferably 30 minutes to one hour.

The following Examples are submitted to illustrate the invention. Unless otherwise indicated, all parts and percentages are based upon weight.

EXAMPLE 1

A resinifiable mix was prepared as follows:

| Component | Parts |
| --- | --- |
| Liquid polybutadiene, mol. wt. 2000 | 56 |
| Vinyl toluene | 36 |
| Pale Crepe rubber, 62 Mooney | 4 |
| Ethylene dimethacrylate | 4 |
| Dicumyl peroxide | 2 |
| 2,5-dimethyl-2,5-bis-(tert-butyl-peroxy) hexane | 2 |

To separate portions of the above mix, metal particles and metal oxide particles and a silane were added and the resultant metal-filled and metal oxide filled resinifiable thermosetting mixtures were allowed to stand overnight and remixed just prior to molding. The metals were zinc and nickel and the metal oxides were ZnO and NiO. Panels 9 × 5 × ⅛ inch were mold-cured one hour at a cure temperature of 320° F. and a total pressure of 45 tons to insure closing of the mold to the stops. All of the panels were subsequently post-cured at 325° F. for 2 hours to insure that a maximum cure had been obtained. A gasket installation of rubber tape was placed around the cavity to provide sufficient back pressure to squeeze out entrapped air and a commercial grade of polyester film, 1.5 mils, was used for mold release in order to avoid the use of extraneous mold release agents.

The laminate of the panels prepared from the zinc oxide and the zinc panels were prepared by first B-staging each of the two panels and then laying them together and completing the cure at 325° F. as described above. The identical procedure was carried out for the nickel panel and the nickel oxide panel to prepare a dual laminate.

The samples prepared above in Example 1 were about 0.35 cm thick and sections of these laminates were cut for in-wave-guide measurements using the techniques and calculations of the generally accepted short circuit-open circuit method (SC-OCM). This technique is used to measure the $\epsilon^*$ and $\mu^*$ of a material by placing the sample in a position where the electric field (E) is a minimum and the magnetic field (H) is a maximum (SC) and then in a field in which E is a maximum and H is a minimum (OC). In this Example and the following Examples, gamma-methacryloxypropyl trimethoxy silane was used in the proportions of 3 parts by weight per 100 by weight of resin.

The laminates had DC resistivities in excess of $10^{17}$ ohm cm and low reflectivities at reasonable thicknesses as shown in the following Table.

| Filler | Wt.% | Resonance[1] Thickness,cm | % Reflected Power at 8.55 GHz | 9.20 GHz | 9.90 GHz | Lbs/sq.ft. |
| --- | --- | --- | --- | --- | --- | --- |
| Zn/ZnO[2] | 89/57 | 0.60 | 0.9 | 0 | 0.7 | 3 |
| Ni/NiO | 87.5/80 | 0.40 | 1.2 | 2.9 | 6.1 | 3.1 |

Per Cent Reflected Power at Various Frequencies at Near Resonance Thickness

[1]As determined theoretically from the results of the SC-OCM measurements at the indicated frequencies
[2]Zn molding was 800 parts of 200 mesh Zn powder per 100 of resin; and ZnO molding was 134 parts per 100 of resin It can be seen from the above Table that low reflection coefficients are obtainable at rather low densities.

EXAMPLE 2

The technique of Example 1 was repeated except that the metal and metal oxide were used as a mixture.
100 parts resin
66 parts zinc oxide (average particle size 0.11 micron)
200 parts zinc metal (100% through 200 mesh screen and 98% through 300 mesh)
The cure was only for one hour to give an excellent ⅛ inch flat panel.

EXAMPLE 3

The technique of Example 2 was repeated except that the following proportions of ingredients were used:
100 parts resin
200 parts nickel oxide (reagent grade powder)
350 parts nickel metal (100% through 200 mesh and 75% through 325 mesh)
The above Examples 2 and 3 illustrate the use of a mixture of oxide and metal together rather than in separate laminar arrangement. Although this is less preferable than the other techniques disclosed herein, it is one that can be used.

EXAMPLE 4

The following resin was formulated:

| | Parts |
| --- | --- |
| Liquid polybutadiene, mol. wt. 2000 | 56 |
| Vinyl toluene | 34 |
| Polyisoprene rubber*, 28 Mooney | 6 |
| Ethylene dimethacrylate | 4 |
| Gamma methacryloxypropyl trimethoxy silane | 3 |
| Dicumyl peroxide | 2 |
| 2,5-dimethyl-2,5-bis-(t-butyl-peroxy) hexane | 2 |
| Calcined alumina ($Al_2O_3$) powder | 200 |

*Purchased from the Goodyear Tire and Rubber Company as Natsyn synthetic rubber. Is over 99% polyisoprene polymer.

The $Al_2O_3$ powder was 96% through a 100 mesh screen and 60% through a 200 mesh screen. The above mix was cured as a 1/16 inch sheet by heating at 290° F. for 10 minutes in a cavity mold. This B-staged molding, which was quite flexible but sufficiently strong that it could be handled, was then placed in a ⅛ inch cavity mold and an aluminum metal-filled compound, prepared as above except that 300 parts of aluminum powder (100% through 200 mesh and 93% through 325 mesh) was used as filler instead of the $Al_2O_3$, was poured on top of the $Al_2O_3$ composite layer. Curing was then carried out for an hour at 320° F. to give a strong well adhered two layer laminate.

EXAMPLE 5

Using the resin of Example 4, a dual layer laminate was prepared using:

175 parts of $Fe_2O_3$ (ferric oxide) as the oxide layer, and 400 parts of 3-micron Fe powder as the metal-filler layer.

The articles of Examples 4 and 5 were evaluated as radar protective shields and the results were found to be substantially equivalent to those set forth in Example 1.

It is to be noted that it is important to the inventive concept that the portion of the shield containing the metal oxide particles be directed toward the radar waves. Moreover, the shielding material or article need not be laminated directly to the metal to be protected, although it can be. It can be attached or arranged in any convenient manner as will be apparent to one skilled in the art.

Although the invention has been described with some degree of particularity, it will be understood that variations and modifications can be made therein without departing from the spirit of the invention as hereinafter claimed.

What is claimed is:

1. A filled plastic material composition suitable for use as a radar shield comprising (1) a first layer of filled plastic comprising about 40 to about 93 weight percent of filler particles and about 7 to about 60% by weight of a hydrocarbon thermosetting plastic wherein said filler particles are metals selected from the group consisting of aluminum, iridium, tin, lead, bismuth, elements from Group IIB to Group VIIB of the Periodic Table of the Elements and mixtures thereof and (2) a second layer of filled plastic superimposed on said first layer said second layer comprising about 40 to about 93 weight percent of filler particles and about 7 to about 60% by weight of a hydrocarbon thermosetting plastic wherein said filler particles are oxides of metals selected from the group consisting of aluminum, iridium, tin, lead, bismuth, elements from Group IIB to Group VIIB of the Periodic Table of the Elements and mixtures thereof.

2. An article according to claim 1 wherein said metal-filled plastic material comprises:
   A. A resinifiable mix comprising:
      1. a substantially hydrocarbon material selected from the group consisting of:
         a. (i) a polymer having at least 50% of its olefinic unsaturation as the 1,2-ethylene type, a number average molecular weight of up to about 15,000 and prepared from about 50 to 100 mole % of a $C_4$ to $C_6$ conjugated diolefin and from about 50 to 0 mole % of a styrene-type monomer, and
         (ii) a reactive diluent comprising a styrene-type monomer; and
         b. (i) a styrene-type monomer and
         (ii) at least one monomeric, nonconjugated, multiunsaturated cross-linking agent; and
      2. a peroxide-curable elastomer;
   B. metal particles having an average particle size of about 0.1 to about 100 microns, said metal particles being selected from the group consisting of metals, metal mixtures, and metal oxides of aluminum, tin, lead and Group IIB to VIIB elements of the Periodic System; and
   C. at least one organic peroxide; and
   D. 0.5 to about 20wt. %, based on the weight of said mix, of said multiunsaturated cross-linking agent; and
   E. 0 to about 5 parts by weight, per 100 parts of said mix, of an organosilane compound coupling agent selected from the group consisting of an unsaturated silane, its silanols, its siloxanes and mixtures thereof.

3. The article of claim 2 in which the $C_4$ to $C_6$ conjugated diolefinic polymer is a homopolymer of butadiene.

4. The article of claim 2 in which the $C_4$ to $C_6$ conjugated diolefinic polymer is a copolymer of butadiene and styrene.

5. The article of claim 2 in which the reactive diluent is vinyl toluene.

6. The article of claim 2 in which the styrene-type monomer is styrene.

7. The article of claim 2 in which the multiunsaturated cross-linking agent is divinyl benzene.

8. The article of claim 2 in which the multiunsaturated cross-linking agent is ethylene dimethacrylate.

9. The article of claim 2 in which the peroxide-curable elastomer is selected from the group consisting of natural rubber, synthetic polyisoprenes, ethylene-alphaolefin copolymers, butadiene-styrene copolymers and polybutadiene and mixtures of two or more elastomers thereof.

10. The article of claim 2 in which the metal particles have an average particle size of 3 to 70 microns.

11. The article of claim 2 in which the organic peroxide is selected from the group consisting of dicumyl peroxide, benzoyl peroxide, 2,5-dimethyl-2,5-bis-(tert-butylperoxy) hexane, 2,5-dimethyl-2,5-bis-(tert-butylperoxy) hexyne-3, 2,4-di-(tert-butyl-peroxyisopropyl) benzene, tert-butyl perbenzoate, and mixtures thereof.

12. The article of claim 2 in which the unsaturated silane is gamma-methacryloxypropyl trimethoxy silane.

13. The article of claim 2 in which the unsaturated silane is vinyl tri-(beta-methoxy ethoxy) silane.

14. The article of claim 2 which has been cured to a metal-filled solid thermoset plastic with the aid of elevated temperatures and superatmospheric pressures.

15. The composition of claim 1 wherein the total thickness of the two layers is about 0.030 to about 0.250 cm.

16. The composition of claim 1 wherein the thickness of the first layer is about 0.015 to about 0.200 cm.

17. The composition of claim 1 wherein the filler particles of the first layer comprise carbonyl iron and the filler particles of the second layer comprise iron oxides $Fe_2O_3$.

18. The composition of claim 1 wherein the average filler particle size is about 0.1 to about 30 microns.

19. The composition of claim 1 wherein the filler particles are substantially spherical in shape.

20. A process for shielding metallic articles from detection by radar waves which comprises interposing between said metal article and said radar wave the composition of claim 1.

21. A process for shielding metallic articles from detection by radar waves which comprises interposing between said metal article and said radar wave the composition of claim 2.

* * * * *